United States Patent [19]

Srivastava

[11] 4,334,243
[45] Jun. 8, 1982

[54] PULSE WIDTH LIMITER
[75] Inventor: Gopal K. Srivastava, Buffalo Grove, Ill.
[73] Assignee: Zenith Radio Corporation, Glenview, Ill.
[21] Appl. No.: 224,593
[22] Filed: Jan. 12, 1981
[51] Int. Cl.³ .................... H04N 5/08; H04N 5/04
[52] U.S. Cl. ......................................... 358/153
[58] Field of Search ................ 358/153, 154, 158; 328/58; 307/265, 266

[56] References Cited
U.S. PATENT DOCUMENTS 3,172,951 3/1965 Field ............................... 358/158
3,688,037 8/1972 Epri ................................ 358/158
4,064,541 12/1977 Schneider et al. ................ 358/153

Primary Examiner—John C. Martin

[57] ABSTRACT

A pulse width limiter is described for extracting horizontal sync pulses from a composite sync signal and applying the extracted sync pulses to a horizontal phase detector. The pulse width limiter includes a signal processing path and a pulse width sensor. The signal processing path has an input terminal for receiving the composite sync pulse and an output terminal which is coupled to the phase detector. A switch couples the input terminal to the output terminal under normal conditions and decouples the input terminal from the output terminal in response to a disabling signal. The pulse width sensor also receives the composite sync pulse and detects the width of each pulse therein. When the pulse width sensor senses that a particular pulse has a width greater than a predetermined width, the sensor applies a disabling signal to the switch in the signal processing path thereby preventing portions of the pulses greater than the predetermined width from being coupled to the phase detector.

5 Claims, 1 Drawing Figure

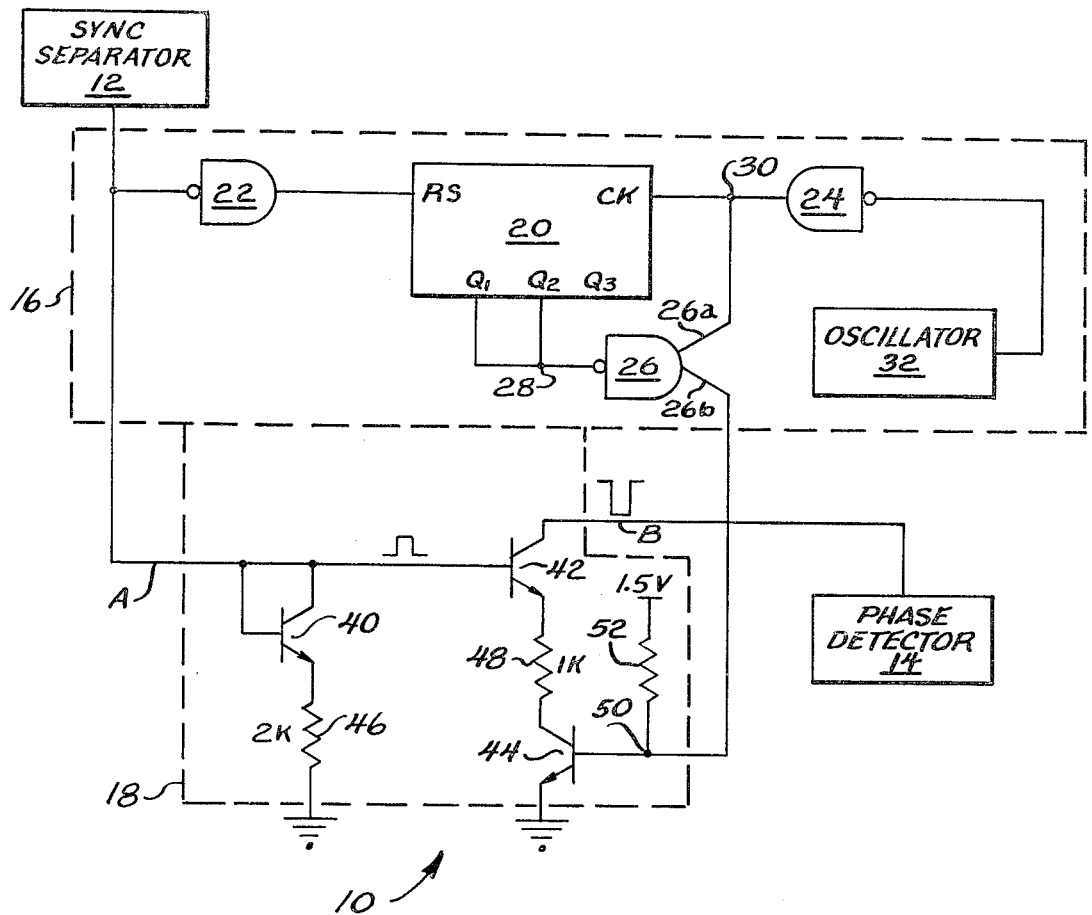

PULSE WIDTH LIMITER

BACKGROUND OF THE INVENTION

The invention is directed generally to television receivers and, more particularly, to a pulse width limiter for extracting horizontal sync information from a composite sync signal which includes both horizontal and vertical sync pulses.

Composite video signals received by a television receiver include video components as well as horizontal and vertical synchronizing (sync) pulses. In a typical television receiver, a sync separator receives the composite video signal, strips the video components therefrom, and outputs a composite sync signal containing horizontal and vertical sync pulses. The composite sync signal developed by the sync separator is used to synchronize the receiver's horizontal and vertical scan with the composite video signal.

To lock the receiver's horizontal scan to the incoming horizontal sync pulses, the latter pulses are typically applied to a phase detector which also receives horizontal rate flyback pulses developed by the receiver. The phase detector generates an error signal indicative of any frequency and/or phase difference between its inputs, and the error signal is used to adjust the operation of the receiver's horizontal oscillator until phase lock is achieved.

Because such phase detectors are sensitive to the widths of the sync pulses they receive, it is desirable to limit the widths of the applied sync pulses to a maximum value. This is particularly true of the broad sync pulses typically broadcast during the field sync interval which occurs during vertical retrace. The application of those broader sync pulses to the horizontal phase detector may generate a faulty error signal if the horizontal phase detector has some nonlinearity and/or offset. The faulty error signal then shifts the frequency of the horizontal oscillator to an incorrect value. After the broad pulses are completed, the phase detector, upon receiving normal width sync pulses, brings the frequency of the horizontal oscillator back to its correct value. However, depending on the phase detector's time constant, a top hook may be visible on the screen in vertically shaped objects.

Another reason for limiting the pulse width of the horizontal sync pulses is because of the receiver's operation during channel changing by a user. During the intermittent period between channels, there is no video signal. When the signal reappears, the RF (radio-frequency) amplifier and the IF (intermediate-frequency) amplifier are at maximum gain. This condition may cause an overload wherein the composite video input to the sync separator appears as a very broad sync pulse. Consequently, the horizontal oscillator is pulled toward an incorrect frequency in a manner similar to the situation which occurs when the field sync pulses are received. Since automatic gain control of the RF and IF amplifiers is dependent on the horizontal oscillator being phase locked with the incoming sync pulses, a longer period of time is required for the RF and IF amplifiers to reduce gain.

Due to the aforementioned problems, prior sync separators have employed a differentiating process wherein the composite sync signal is passed through a high pass filter to limit the width of the horizontal sync pulses. The high pass filter is typically formed by an external or on-chip RC (resistor-capacitor) network. However, the space requirements and the reliability problems inherent in an RC filter network are undesirable.

The present invention overcomes the problems cited above by providing an improved differentiation process wherein the pulse widths of horizontal sync pulses are restricted by a digital pulse width limiter.

OBJECTS OF THE INVENTION

It is a general object of the invention to provide improved differentiation circuitry for horizontal sync pulses.

It is a more specific object of the invention to provide a digital pulse width limiter for efficiently and inexpensively limiting the pulse width of horizontal sync pulses.

BRIEF DESCRIPTION OF THE DRAWING

The above objects and further objects of the invention will be realized more particularly from the description of the preferred embodiment and from the accompanying drawing.

FIG. 1 illustrates a preferred embodiment of a pulse width limiter according to the invention and the manner in which it interfaces with a sync separator and a horizontal phase detector.

DETAILED DESCRIPTION OF THE PREFERRED EMBODIMENT

Referring to FIG. 1, the numeral 10 designates generally a pulse width limiter which receives a composite sync signal from a sync separator 12 and, thereafter, applies width controlled horizontal sync pulses to a horizontal phase detector 14, all of which are preferably included in a single integrated circuit chip in a television receiver. Subsequently, the phase detector 14 compares the horizontal sync pulses to a train of horizontal rate flyback pulses (not shown) developed by the receiver and then generates an error signal (also not shown) indicative of any frequency and/or phase difference between the two inputs. Thereafter, the error signal implements an adjustment in the receiver's horizontal oscillator until a phase lock is achieved. The pulse width limiter 10 restricts the width of the horizontal sync pulses to ensure that the error signal is not affected by any nonlinearity in the horizontal phase detector 14.

To effect such control over the widths of the pulses applied to the phase detector 14, the pulse width limiter 10 includes a sensor 16 to detect the widths of composite sync pulses output from the sync separator 12, and a signal processing path 18, controlled by the sensor 16, for coupling composite sync pulses of a maximum, predetermined width to the phase detector 14.

Generally, the processing path 18 is enabled by the pulse width sensor 16 for coupling sync pulses from the sync separator at terminal A to the phase detector via a terminal B in the event that no such pulse exceeds a predetermined width. When the width of a sync pulse is determined by the sensor 16 as being greater than a predetermined maximum width, the processing path 18 is disabled so as to limit the width of the pulse which is coupled from terminal A to terminal B. In this manner, wide vertical sync pulses and abnormally wide horizontal sync pulses are clipped so that the width of any sync pulse applied to the phase detector is limited to a predetermined maximum value.

Referring more specifically to the pulse width sensor 16, the latter device includes a three bit counter 20, gates 22, 24, and 26, I²L AND gates represented by the nodes 28 and 30, and an oscillator 32. Generally, the counter 20 is enabled by the occurrence of each pulse generated by the sync separator 12 to begin counting clock pulses from the oscillator 32. If a pulse terminates before the counter attains a predetermined maximum count, this is an indication that the width of that pulse is no greater than a maximum allowable width. Under that condition, the path 18 is held in an enabled mode for coupling the pulse from the sync separator to the phase detector. If the counter reaches a predetermined count before the pulse terminates, the path 18 is disabled for terminating the application of the pulse to the phase detector.

In the preferred embodiment, the counter 20 has two input terminals, a reset (RS) terminal and a clock (CK) terminal. The composite sync pulse from the sync separator 12 is applied to the RS terminal via inverter gate 22, while a train of clock pulses from the oscillator 32 is applied to the CK terminal via inverter gate 24 and AND gate node 30.

The inputs at the RS and the CK terminals activate an upward count in the three bit counter 20 which is registered at binary output terminals $Q_1$, $Q_2$, and $Q_3$. Each count corresponds to approximately one microsecond of elapsed time where the frequency of the oscillator is selected to be 1.007 MHz. The binary information at the $Q_1$ and the $Q_2$ terminals is applied to AND gate node 28 which functions as a decoder for sensing the state of the counter 20. The output from the node 28 is connected to inverter gate 26. The inverter gate 26 generates two similar signals on lines 26a and 26b which are then applied to the AND gate node 30 and the transmission path 18, respectively.

The counter 20 and its associated gates operate as a pulse width sensor in the following manner. Assuming that a low level output signal is generated by the sync separator 12 to represent the interval between composite sync pulses, the inverter gate 22 receives the low level signal and produces a high level output which is applied to the RS terminal of counter 20. Consequently, output terminals $Q_1$, $Q_2$, and $Q_3$ are each reset at 0.

Meanwhile, the oscillator 32 is generating a train of clock pulses which are inverted by inverter gate 24 and applied as one input to the AND gate node 30. The $Q_1$ and $Q_2$ output terminals apply 0 inputs to the AND gate node 28, resulting in a low or 0 state being applied to inverter gate 26. Consequently, the inverter gate 26 generates a high or 1 which is applied to the other input of the AND gate node 30. As a result, the CK terminal receives the clock signal from the oscillator 32. However, no counting is registered by the counter 20 as long as the input to the RS terminal is high.

When the sync separator 12 produces the composite sync signal, a high level signal is applied to the inverter gate 22. Accordingly, a low level signal is applied by the inverter gate 22 to the RS terminal, thereby commencing an upward count by the counter 20. Consequently, when the next high level signal is applied by the AND gate node 30 to the CK terminal, a 1 is registered at $Q_3$ such that $Q_1$, $Q_2$, and $Q_3$ represent the binary number 1, that is, 001. Since $Q_1$ and $Q_2$ remain at 0, the outputs of the AND gate node 28 and the inverter gate 26 are unchanged. Accordingly, a high level signal continues to be applied to the AND gate node 30, thereby permitting additional clock pulses to be received by the CK terminal. When the second clock pulse is applied to the CK terminal, $Q_2$ flips to a 1 and $Q_3$ flops back to a 0 such that $Q_1$, $Q_2$, and $Q_3$ represent the binary number 2, that is, 010. The 0 and 1 from $Q_1$ and $Q_2$, respectively, are applied to the decoder AND gate node 28, again resulting in a low being applied to inverter gate node 26 and a high being applied to the AND gate node 30. Therefore, the AND gate node 30 remains enabled for applying a clock pulse to the CK terminal when a high is outputted from the inverter gate 24.

The counter 20 continues to count upwardly in the aforementioned manner until either the composite sync pulse is completed or the counter registers a binary 6 (110). If the composite sync pulse is less than six microseconds wide, a low is generated by the sync separator 12 once the composite sync pulse for the particular line of video is completed. Accordingly, a high is generated by the inverter 22 and applied to the RS terminal of the counter 20. As a result, the counter 20 resets $Q_1$, $Q_2$, and $Q_3$ to 000 in preparation for the next counting period which commences upon the occurrence of the next composite sync pulse.

If the counter 20 registers a binary 6 (110) at output terminals $Q_1$, $Q_2$, and $Q_3$ before the completion of the composite sync pulse, then counting is terminated. The registering of a binary 6 by the counter 20 is the first time in the counting sequence in which both $Q_1$ and $Q_2$ simultaneously register a 1. Accordingly, a 1 is applied by both $Q_1$ and $Q_2$ to the decoder AND gate node 28, thereby resulting in a high level signal being applied to the inverter gate 26. Thereafter, a low level signal is generated by the inverter gate 26 and applied to both the signal processing path 18 and the AND gate node 30. That low level signal inhibits the AND gate node 30 from applying any more clock pulses to the CK terminal of the counter 20.

The signal processing path 18 includes a transistor network defined by transistors 40 and 42 and resistors 46 and 48. This transistor network is arranged as a voltage amplifier or current mirror to provide a signal processing path between the sync separator 12 and the horizontal phase detector 14. The base of the transistor 40 functions as the input terminal A for receiving the composite sync signal, while the collector of the transistor 42 functions as the output terminal B. A transistor 44 is connected to the transistor 42 via resistor 48 and operates as a switch to couple the input terminal A to the output terminal B and to decouple the input terminal A from the output terminal B in response to a disabling signal from an inverter gate node 50, as discussed below.

The transistor 40 is arranged such that its base and collector are tied together and connected between the sync separator 12 and the base of transistor 42. The emitter of transistor 40 is coupled to the resistor 46 which, in turn, is grounded. In this manner, the transistor 40 conducts significantly when the composite sync pulse attains a maximum voltage level.

The base of transistor 42 is connected directly to both the collector of transistor 40 and the sync separator 12 so that it receives the same voltage as that applied to transistor 40. The transistor 42 also has its collector connected to the phase detector 14 and its emitter connected to the collector of transistor 44 via resistor 48. The base of transistor 44 is coupled to line 26b and to a resistor 52 at the AND gate node 50, while the emitter of transistor 44 is grounded. The resistor 52 is also connected to a power supply of 1.5 volts. In the preferred embodiment, the impedance for resistor 48 (1K ohms) is half that of resistor 46 (2K ohms). Therefore, twice the current flows through the base-emitter of transistor 42 when transistor 44 is turned on, thereby resulting in an amplified current signal as the output on the collector of transistor 42. This amplified current signal is the horizontal sync pulse which is then applied to the phase detector 14.

The width of the horizontal sync pulse is limited in the following manner. The transistor 40 conducts current for the duration of the composite sync pulse. If the transistor 44 is turned on, then the transistor 42 will also conduct current and output a horizontal sync pulse for application to the phase detector 14.

The transistor 44 is regulated by the signal it receives from the AND gate node 50. The resistor 52 acts as a load to constantly maintain a high level signal as one input into the AND gate node 50. As mentioned previously, the outputs from inverter gate 26 are high unless the counter registers a binary 6 (110) at $Q_1$, $Q_2$, and $Q_3$. Therefore, when the composite sync pulse for a particular line is initially generated by the sync separator 12, the input from line 26b to the AND gate 50 is high. Accordingly, transistor 44 is turned on, both transistors 40 and 42 are conducting current, and a horizontal sync pulse is generated on transistor 42's collector. Meanwhile, counter 20 is counting upwardly. If the duration of the composite sync pulse reaches six microseconds, the counter 20 will register a binary 6 (110) and $Q_1$ and $Q_2$ will each outupt a 1 to the decoder AND gate node 28. Accordingly, a high level signal is generated by the decoder AND gate node 28 and inverterted to a low on lines 26a and 26b by the inverter 26. The low level signal on line 26a freezes the counter 20 at the six count level, while the disabling low level signal on line 26b is applied to the AND gate node 50. Thereafter, the AND gate node 50 generates a low level signal and transistor 44 turns off. The transistor 42 stops conducting current and the horizontal sync pulse is terminated. Accordingly, each horizontal sync pulse is limited to a maximum width corresponding to a time duration of six microseconds. If the pulses are narrower than six microseconds, then no width limiting occurs.

In summary, the pulse width limiter amplifies and applies the horizontal sync pulses from the composite sync signal to the phase detector 14 as long as the width of each pulse is not greater than a maximum predetermined width. When a particular pulse is wider than this maximum predetermined width, then the pulse width limiter disables the pulse from the phase detector so that the portion of the pulse exceeding the maximum predetermined width is not applied to the phase detector.

In the above description, specific details of an embodiment of the invention have been provided for a thorough understanding of the invention concepts. It will be understood by those skilled in the art that many of these details may be varied witout departing from the spirit and scope of the invention.

What is claimed is:

1. In a television receiver having a sync separator for generating a composite sync signal including horizontal sync pulses and vertical sync pulses, and having a horizontal phase detector adapted to receive horizontal sync pulses for synchronizing the latter pulses with flyback pulses generated by the receiver, a pulse width limiter for extracting the horizontal sync pulses from the composite sync signal developed by the sync separator and for applying the extracted horizontal sync pulses to the horizontal phase detector, comprising:

a signal processing path having an input terminal receiving the composite sync signal, having an output terminal coupled to the phase detector, and having switch means for coupling the input terminal to the output terminal and for decoupling the input terminal from the output terminal in response to a disabling signal; and a pulse width sensor receiving the composite sync signal for detecting the width of each pulse therein and for applying a disabling signal to said switch means in response to each pulse in the composite sync signal which has a width greater than a predetermined horizontal sync pulse width so as to prevent portions of the pulses greater than the predetermined width from being coupled to the phase detector.

2. The pulse width limiter of claim 1 wherein said signal processing path includes amplifier means controlled by said switch means for transmitting the composite sync signal in the absence of the disabling signal.

3. The pulse width limiter of claim 2 wherein said amplifier means is arranged in the form of a current mirror.

4. The pulse width limiter of claim 1 wherein said pulse width sensor includes an oscillator for generating a train of clock pulses, a counter adapted to count the clock pulses upon the occurrence of each pulse in the composite sync signal and adapted to be reset upon the termination of each such pulse, and decoder means for sensing the state of said counter and for generating a disabling signal for application to said switch means when the counter's state is indicative of a predetermined count so as to decouple the composite sync signal from the phase detector.

5. In a television receiver having a sync separator for generating a composite sync signal including horizontal sync pulses and vertical sync pulses, and having a horizontal phase detector adapted to receive horizontal sync pulses for synchronizing the latter pulses with flyback pulses generated by the receiver, a pulse width limiter for extracting the horizontal sync pulses from the composite sync signal developed by the sync separator and for applying the extracted horizontal sync pulses to the horizontal phase detector, comprising:

a current mirror having an enabled mode for transmitting the composite sync signal and applying the transmitted signal to the phase detector and having a disabled mode for decoupling said transmitted signal from the phase detector;

an oscillator for generating a train of clock pulses;

a counter responsive to the leading edge of each pulse in the composite sync signal for counting said clock pulses and adapted to be reset upon termination of each pulse; and decoder means responsive to said counter attaining a count less than a predetermined count for holding said current mirror in its enabled mode, and responsive to said counter attaining the predetermined count for placing the current mirror in its disabled mode.

* * * * *